Patented July 7, 1942

2,289,292

UNITED STATES PATENT OFFICE 2,289,292

PROCESS OF PREPARING ANTHRAQUINONE DITHIAZOLES

Wendell P. Munro, Bound Brook, and Glen M. Smyth, Plainfield, N. J., assignors to American Cyanamid Company, New York, N. Y., a corporation of Maine No Drawing. Application May 14, 1940, Serial No. 335,148

13 Claims. (Cl. 260—303)

This invention relates to a process of preparing anthraquinone diphenyl dithiazoles.

In the past a member of the anthraquinone diphenyl dithiazoles, namely 1,2,5,6 anthraquinone-C-diphenyl dithiazole Algol Yellow GC (Schultz Farbstoff Tabellen Sup. 1 #127 4a) which has the following formula:

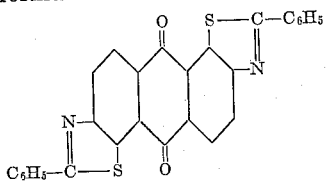

has achieved considerable commercial importance. This color is normally made from 2,6-diamino anthraquinone by reaction with sulfur and benzotrichloride in an inert organic solvent such as naphthalene at high temperatures. This procedure results in a rather impure product which has to be further purified by dissolving in concentrated sulfuric acid and reprecipitating it with a limited amount of water, for example. The yield obtained by this process is only about 50% of the theoretical and the reaction time is very long, about twenty hours.

The present invention is based on the use of primary and secondary amines of the benzene, diphenyl, and naphthalene series or their reaction products with benzotrichloride. Aniline reacts with benzotrichloride to form N,N'-diphenyl benzamidine hydrochloride which produces substantially the same result in the process of the present invention, and it is probable that when the amines are used in the present invention they react with the benzotrichloride and are present in the form of the reaction products during the reaction. However, the invention is not limited to any particular theory of action and the results are substantially the same whether amines are added as such or whether the reaction products with benzotrichloride are used. The exact way in which the amines act is also not known and it is quite possible that their action may be to some extent at least catalytic, although again the invention is not limited by any particular theory as to the exact mechanism of the process for it has not yet been definitely proved.

The present invention is not limited to any particular primary or secondary amine of the benzene, diphenyl and naphthalene series. All of the amines tried have been shown to have advantageous results in increasing the yield and purity and also decreasing the time. For practical purposes it is usually desirable to use aniline or its reaction product with benzotrichloride because of the greater cheapness of this amine. However, good results are obtained with the toluidines, N-alkyl- anilines such as N-methyl aniline, the naphthylamines and diamines such as p-phenylenediamine and benzidine, and the reaction products with benzotrichloride such as N,N'-diphenyl benzamidine.

The invention is also not critical as to amount of the amines and this is one of the advantages. Even small amounts of the amines or their reaction products with benzotrichloride exert a beneficial result which makes it probable that some of the action at least is catalytic. However, it is also possible that there is a factor employing the amines as an intermediate reagent because the effects are increased with additional amounts of amine until an optimum range is reached which with aniline is for example, 2 and 3 moles of the amine per mole of 2,6-diamino anthraquinone. While the amount of amine is not critical as pointed out above, there should be an excess of benzotrichloride over that stoichiometrically equivalent to the amine.

The present invention is applicable not only to treating 2,6-diamino anthraquinone with sulfur and benzotrichloride to form Algol Yellow GC, but it can also be applied with other diamino anthraquinones leaving the amino groups on different rings producing the corresponding diphenylthiazoles. It is an advantage of the present invention that the equipment and general manipulation of the reaction is not changed by the use of the amines and therefore the plant operator does not have to learn a new technique. Thus, for example, the present invention operates well when the reaction is carried out in inert organic solvents such as molten naphthalene at temperatures above 150° C., preferably 200 to 240° C. In each case the reaction proceeds smoothly, the time cycle is greatly decreased, for example in the case of Algol Yellow GC where aniline is used, from 20 to about 10 hours. Higher yields are likewise obtained of a purer product which can be easily filtered in crystalline form. In the case of Algol Yellow GC and aniline the improvement in yield is from 50% to about 78% of the theory based on the diamino anthraquinone.

The invention will be described in conjunction with the following specific examples which are typical illustrations of the invention, which however is not limited to the details therein set forth. The parts are by weight.

Example 1

140 parts naphthalene, 18 parts 2,6-diamino anthraquinone, 28 parts sulfur, and 16 parts aniline are melted together and, while stirring, 94 parts benzotrichloride are added. The mixture is heated slowly to reflux, and stirred at reflux (about 225° C.) for 10 hours. It is then cooled to 180° C., diluted with o-dichlorobenzene, cooled further to 100–115° C., and filtered with suction at that temperature. The product is washed with o-dichlorobenzene and alcohol, and dried. The yield is 28 parts or 78% of the theoretical. The product appears as pure yellow crystals.

Instead of 16 parts aniline, 22 parts p-toluidine or 9 parts p-phenylene diamine or 15 parts benzidine or 22 parts monomethylaniline or 24 parts beta-naphthylamine or 22 parts N,N'-diphenyl benzamidine may be used. The result is similar.

*Example 2*

140 parts naphthalene, 18 parts 2,7-diamino anthraquinone, 28 parts sulfur, and 22 parts aniline are melted together, and while stirring the mixture at 80–100° C., 94 parts benzotrichloride are added. The mixture is heated gradually to reflux, and stirred at reflux for 10 hours. The product is isolated as in Example 1, in the form of well defined yellow crystals.

Sometimes other products are referred to as "Algol Yellow" but throughout this specification and claims when the term "Algol Yellow GC" is used a compound of the above chemical constitution is meant and it is not intended that this expression shall have any other meaning in the specification and claims.

We claim:

1. A process for preparing anthraquinone diphenyl dithiazoles in which the thiazole rings are linked to different rings of the anthraquinone nucleus which comprises reacting a diamino anthraquinone having the amino groups on different rings with sulfur and benzotrichloride in an inert organic solvent at temperatures above 150° C. in the presence of a member of the group consisting of primary and secondary amines of the benzene, diphenyl and naphthalene series and their reaction products with benzotrichloride.

2. A process of producing 1,2,5,6-anthraquinone-C-diphenyl dithiazole which comprises reacting 2,6-diamino anthraquinone with sulfur and benzotrichloride in an inert organic solvent at temperatures above 150° C. in the presence of a member of the group consisting of primary and secondary amines of the benzene, diphenyl and naphthalene series and their reaction products with benzotrichloride.

3. A process for preparing anthraquinone diphenyl dithiazoles in which the thiazoles are linked to different rings of the anthraquinone nucleus which comprises reacting a diamino anthraquinone having the amino groups on different rings with sulfur and benzotrichloride in molten naphthalene at temperatures above 150° C. in the presence of a member of the group consisting of primary and secondary amines of the benzene, diphenyl and naphthalene series and their reaction products with benzotrichloride.

4. A process of producing 1,2,5,6-anthraquinone-C-diphenyl dithiazole which comprises reacting 2,6-diamino anthraquinone with sulfur and benzotrichloride in molten naphthalene at temperatures above 150° C. in the presence of a member of the group consisting of primary and secondary amines of the benzene, diphenyl and naphthalene series and their reaction products with benzotrichloride.

5. A process of producing 1,2,5,6-anthraquinone-C-diphenyl dithiazole which comprises reacting 2,6-diamino anthraquinone with sulfur and benzotrichloride in an inert organic solvent at temperatures above 150° C. in the presence of aniline.

6. A process of producing 1,2,5,6-anthraquinone-C-diphenyl dithiazole which comprises reacting 2,6-diamino anthraquinone with sulfur and benzotrichloride in an inert organic solvent at temperatures above 150° C. in the presence of N,N'-diphenyl benzamidine.

7. A process of preparing anthraquinone diphenyl dithiazoles in which the thiazole rings are linked to different rings of the anthraquinone nucleus which comprises reacting a diamino anthraquinone having the amino groups on different rings with sulfur and benzotrichloride in an inert organic solvent at temperatures between 200° and 240° C. in the presence of a member of the group consisting of primary and secondary amines of the benzene, diphenyl and naphthalene series and their reaction products with benzotrichloride.

8. A process of producing 1,2,5,6-anthraquinone-C-diphenyl dithiazole which comprises reacting 2,6-diamino anthraquinone with sulfur and benzotrichloride in an inert organic solvent at temperatures between 200° and 240° C. in the presence of a member of the group consisting of primary and secondary amines of the benzene, diphenyl and naphthalene series and their reaction products with benzotrichloride.

9. A process of producing 1,2,5,6-anthraquinone-C-diphenyl dithiazole which comprises reacting 2,6-diamino anthraquinone with sulfur and benzotrichloride in molten naphthalene at temperatures between 200° and 240° C. in the presence of a member of the group consisting of primary and secondary amines of the benzene, diphenyl and naphthalene series and their reaction products with benzotrichloride.

10. A process of producing 1,2,5,6-anthraquinone-C-diphenyl dithiazole which comprises reacting 2,6-diamino anthraquinone with sulfur and benzotrichloride in molten naphthalene at temperatures above 150° C. in the presence of aniline.

11. A process of producing 1,2,5,6-anthraquinone-C-diphenyl dithiazole which comprises reacting 2,6-diamino anthraquinone with sulfur and benzotrichloride in molten naphthalene at temperatures between 200° and 240° C. in the presence of aniline.

12. A process for preparing the diphenyl dithiazole from 2,7-diamino anthraquinone which comprises reacting the 2,7-diamino anthraquinone with sulfur and benzotrichloride in an inert organic solvent at a temperature above 150° C. in the presence of a member of the group consisting of primary and secondary amines of the benzene, diphenyl, and naphthalene series and their reaction products with benzotrichloride.

13. A process for preparing the diphenyl dithiazole from 2,7-diamino anthraquinone which comprises reacting the 2,7-diamino anthraquinone with sulfur and benzotrichloride in an inert organic solvent at temperatures from 200° to 240° C. in the presence of a member of the group consisting of primary and secondary amines of the benzene, diphenyl and naphthalene series and their reaction products with benzotrichloride.

WENDELL P. MUNRO.
GLEN M. SMYTH.